(12) United States Patent
Wong et al.

(10) Patent No.: US 7,808,929 B2
(45) Date of Patent: Oct. 5, 2010

(54) EFFICIENT ACL LOOKUP ALGORITHMS

(75) Inventors: Michael K. Wong, Cupertino, CA (US);
Yatin V. Gajjar, Fremont, CA (US);
Ravinder Kumar, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 81 days.

(21) Appl. No.: 12/241,987

(22) Filed: Sep. 30, 2008

(65) Prior Publication Data

US 2010/0080223 A1 Apr. 1, 2010

(51) Int. Cl.
*H04L 12/28* (2006.01)
(52) U.S. Cl. .................. 370/255; 370/401; 370/256
(58) Field of Classification Search ................... None
See application file for complete search history.

(56) References Cited

U.S. PATENT DOCUMENTS

| | | | | |
|---|---|---|---|---|
| 6,539,394 | B1 * | 3/2003 | Calvignac et al. | 707/102 |
| 6,788,683 | B1 * | 9/2004 | Ikeda et al. | 370/389 |
| 7,389,377 | B2 * | 6/2008 | Gupta | 711/108 |
| 2005/0135399 | A1 * | 6/2005 | Baden et al. | 370/428 |
| 2006/0209725 | A1 * | 9/2006 | Cadambi et al. | 370/255 |
| 2009/0310504 | A1 * | 12/2009 | Engbersen et al. | 370/252 |

OTHER PUBLICATIONS

Baboescu, F., et al; "Scalable Packet Classification;" Proc. SCM SIGCOMM, San Diego, CA, pp. 199-210 (Aug. 2001).
Baboescu, F., et al; "Packet Classification for Core Routers: Is There an Alternative to CAMs?"; Proc. IEEE INFOCOM '03; San Francisco, CA, vol. 1, pp. 53-63 (2003).
Gupta, P., et al; "Packet Classification Using Hierarchial Intelligent Cuttings"; Proc. HOT Interconnects VII, Stanford, CA (Aug. 1999).
Lakshman, T.V., et al; "High-Speed Policy-based Packet Forwarding Using Efficient Multi-dimensional Range Matching"; Proc. ACM SIGCOMM, Vancouver, Canada, pp. 203-214 (Sep. 1998).
Srinivasan, V., et al; "Fast and Scalable Layer Four Switching"; Computer Communication Review, a publication of ACM SIGCOMM, vol. 28, No. 4 (Oct. 1998).
Gupta, P., et al; "Packet Classification On Multiple Fields"; Proc. ACM SIGCOMM, Harvard University, pp. 147-160 (Aug. 1999).

* cited by examiner

*Primary Examiner*—Duc C Ho
(74) *Attorney, Agent, or Firm*—Rory D. Rankin; Meyertons, Hood, Kivlin, Kowert & Goetzel, P.C.

(57) ABSTRACT

A rule management system and methods are disclosed. A rule management system includes a processor and an interface for receiving data comprising a plurality of data fields. The processor includes in a data structure nodes corresponding to combinations of first and second data field values. The data structure includes a node for each combination of first and second data field values for which there exists at least one rule and does not include at least one node corresponding to at least one combination of first and second data field values for which there does not exist a rule. The processor associates rules with each node of the data structure. A node and an associated set of rules for processing a data packet may be identified by determining first and second indices into the data structure that correspond to first and second data field values of the received data packet.

20 Claims, 11 Drawing Sheets

| Rule | SA | DA | DP |
|---|---|---|---|
| a 311 | 00* | 100 | 10 |
| b 312 | 10* | 111 | 10 |
| c 313 | 011 | 01* | 11 |
| d 314 | 00* | 01* | 00 |
| e 310 | 011 | 01* | 01 |

Rule List 300

EFFICIENT ACL LOOKUP ALGORITHMS

BACKGROUND OF THE INVENTION

1. Field of the Invention

This invention relates to packet routing and, more particularly, to efficient use of the resources available in a multi-threaded processor environment to search multiple fields of a packet for a matching routing rule.

2. Description of the Related Art

Many computing problems require searching multiple fields of a data packet for a match to one or more of a large set of rules. In packet routing, for example, multiple fields in a packet header may be searched to identify a matching routing rule. A commonly used set of routing rules is an access control list (ACL). An ACL may include a large number of rules, each of which specifies values and ranges of values for one or more fields that determine whether or not a particular action should be allowed. During routing of IP packets, the fields most commonly used in ACL determinations are the IP source address (SA), IP destination address (DA), source port, destination port, protocol ID, and differentiated services control point (DSCP). The actions that may be allowed or disallowed by various ACL rules include dropping a packet, forwarding a packet, routing a packet to the specified destination address, routing the packet through the specified destination port, establishing a priority for routing a packet, and many others.

A number of hardware-oriented solutions to the above problem have been implemented, such as using ternary content addressable memory (TCAM) for rule storage and retrieval. However, these solutions have several disadvantages. TCAM hardware uses more transistors per bit than SRAM. Extra chips are required compared to a software-oriented solution. In addition to requiring more hardware, TCAM hardware presents a problem with power scaling because all comparisons are performed in parallel. Also, TCAM operations may be slow, such as when accessed through program I/O of a network processor. Finally, a brute-force use of TCAM may require very large storage capacity to handle arbitrary ranges of values for individual fields.

In modern computer systems, compute power and memory capacity may be abundant. For example, modern computer systems often utilize multiple processors executing in parallel to increase overall operating efficiency. A variety of configurations are possible including separate microprocessors, a single microprocessor that includes multiple cores, or a combination of the two. A typical multi-threaded microprocessor may support up to 8 GB of memory using 1 GB DIMMs. The availability of these compute resources suggests that an algorithmic solution to the ACL search problem may be desired.

In general, there are two classes of search algorithms to be considered: multidimensional search and divide and conquer search. Multidimensional searches consider the entire space of all of the relevant fields together. Divide and conquer searches perform independent searches on the spaces of each of the fields, combining the results to locate the desired ACL rule.

In multidimensional searches, all of the packet header fields may be searched to find the least cost ACL rule that matches the fields. Searches may be performed over a tree-like data structure that stores the ACL rules such as a grid-of-tries, extended grid-of tries (EGT), extended grid-of tries with path compression (EGT-PC), hierarchical intelligent cuttings (HiCut), or some other trie variant. The more dimensions or fields that are combined in the algorithm, the deeper the trie, the higher the memory latency, and therefore, the lower the performance of each thread. In divide and conquer searches, various techniques may be used to combine the independent search results. A tradeoff may be necessary between computational efficiency and the size of storage needed to support large, pre-computed data structures used in combining search results. Therefore, what is needed is a search algorithm that efficiently uses storage and processing resources.

SUMMARY OF THE INVENTION

Various embodiments of a rule management system and methods are disclosed. In one embodiment, a rule management system includes a processor and an interface for receiving data comprising a plurality of data fields. The processor may comprise a multi-core processor. The processor includes in a data structure nodes corresponding to combinations of first and second data field values. The data structure includes a node corresponding to each combination of first and second data field values for which there exists at least one rule of a plurality of rules and does not include at least one node corresponding to at least one combination of first and second data field values for which there does not exist a rule of a plurality of rules. The processor associates one or more rules of the plurality of rules with each node of the data structure. A node and an associated set of one or more rules for processing a received data packet may be identified by determining first and second indices into the data structure that correspond to first and second data field values of the received data packet.

In a further embodiment, the processor stores in a first wild card list, rules that match multiple first and second data field values. The processor stores in a second wild card list, rules that match multiple first data field values and particular second data field values. The processor stores in a third wild card list, rules that match multiple second data field values and particular first data field values. The processor selects a first rule for processing the received data packet from a subset of rules including rules associated with a node identified by the first and second indices, rules stored in the first wild card rule list, rules stored in the second wild card rule list, and rules stored in the third wild card rule list. In a still further embodiment, the processor orders the rules according to a priority, wherein the first rule is a highest priority rule In a still further embodiment, a first index of the indices is determined by traversing a first hierarchical data structure from a root node to a first leaf node that corresponds to a received first data field value and selecting an index that corresponds to the first leaf node. A second index of the indices is determined by traversing a second hierarchical data structure from a root node to a second leaf node that corresponds to a received second data field value and selecting an index that corresponds to the second leaf node.

In a still further embodiment, each rule specifies whether or not a particular value of the data fields is included in an access control list. Processing a data packet comprises routing the data packet according to the access control list.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
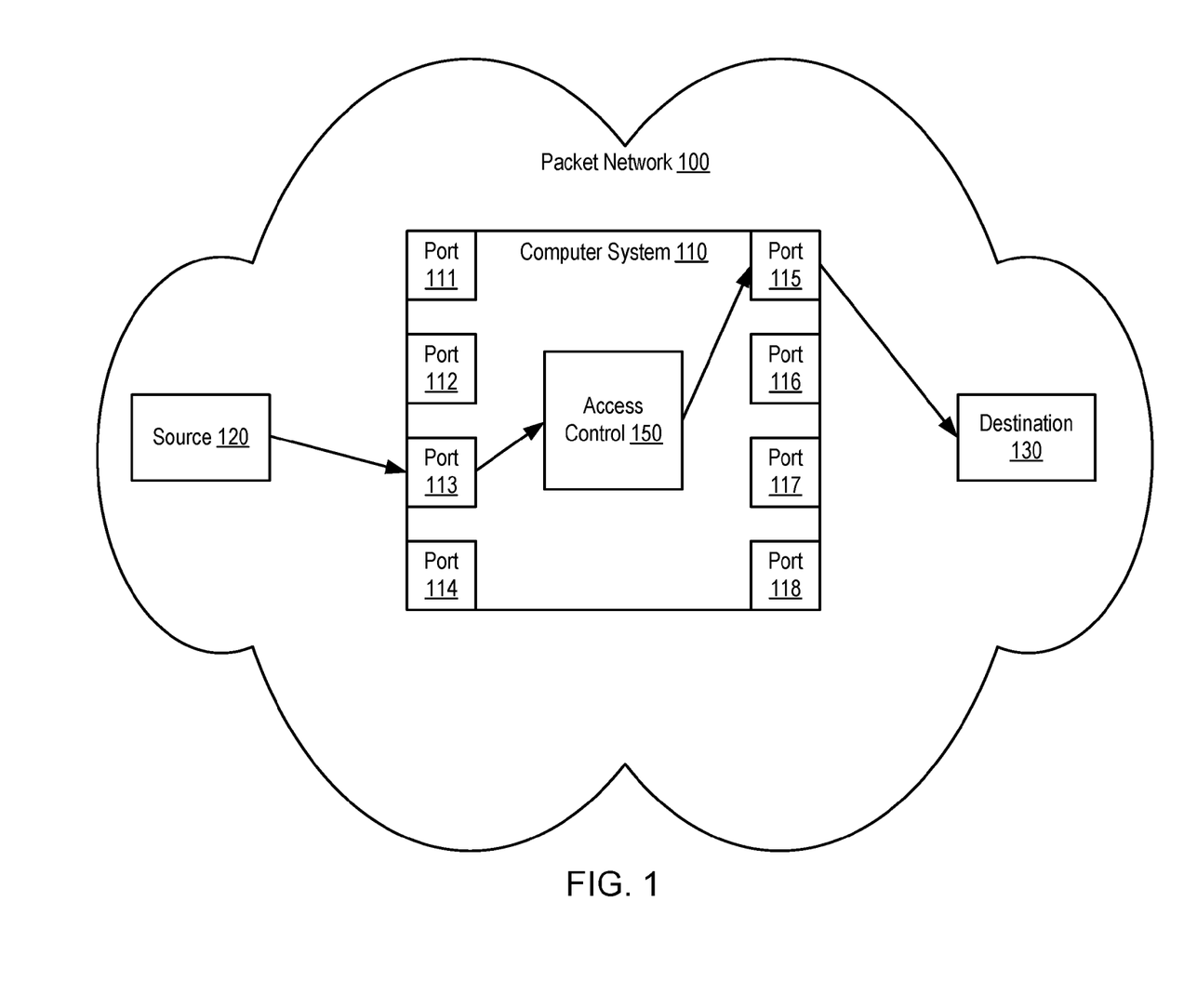
FIG. 1 is a generalized block diagram of one embodiment of a packet network.

FIG. 1 is a generalized block diagram of one embodiment of a packet network 100. Packet network 100 may be the Internet, an intranet, or any other packet network. Generally speaking a packet network includes data sources and destinations interconnected by routers. In the illustrated embodiment, packet network 100 includes a computer system 110, a source 120, and a destination 130. Computer system 110 includes ports 111-118 and access control 150. Source 120 may be coupled to computer system 110 via port 113 and destination 130 may be coupled to computer system 110 via port 115. Computer system 110 is representative of a variety of apparatus that may interconnect data sources and destinations, such as a router, a switch, a computer that includes routing and/or switching functionality, or any interconnected combination of the above. During operation, access control 150 may determine whether or not packets from source 120 may be routed to destination 130 via the illustrated ports according to one or more stored rules.

Figure 2:
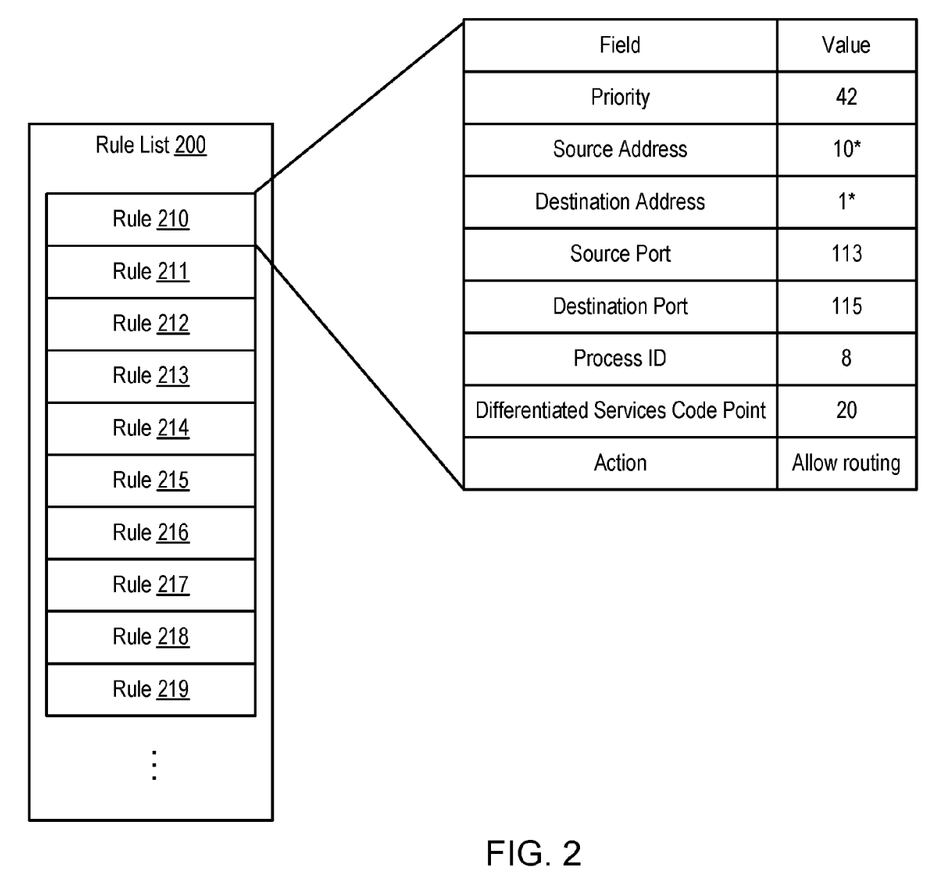
FIG. 2 illustrates one embodiment of a rule list that may be used to control packet access.

FIG. 2 illustrates one embodiment of a rule list 200 that may be used to control packet access. In one embodiment, rule list 200 may be part of a rule management system for processing data packets. Rule list 200 includes rules 210-219 although in practice, a rule list may include any number of rules. In some embodiments, there may be many thousands of rules in a rule list. Each rule may specify a number of fields and their values or ranges of values that are required for a particular action to be permitted. For example, in one embodiment, each rule may include fields and corresponding values for priority, SA, DA, source port, destination port, protocol ID, and differentiated services control point (DSCP). In addition an action field may be included in each rule that specifies an action that is to be allowed or disallowed buy the rule.

In FIG. 2, the fields of rule 210 are shown by way of example. To match a rule, all fields must be matched. The illustrated priority field has a value of 42 that may be a number by which multiple rules may be sorted and stored in an ordered list. The SA field has a value of '10*' indicating that a packet must have a source address having a binary prefix of '10' followed by any bit values to match rule 210 and follow the specified action. As used herein an asterisk may indicate a wild card value. The DA field has a value of '1*' indicating that a packet must have a destination address having a binary prefix of '1' followed by any bit values to match rule 210 and follow the specified action. The source port field has a value of '113' indicating that a packet must arrive on port 113 to match rule 210 and follow the specified action. The destination port field has a value of '115' indicating that a packet must be targeted to port 115 to match rule 210 and follow the specified action. The protocol ID field has a value of '8' indicating that a protocol a packet must have to match rule 210 and follow the specified action. The DSCP field has a value of '20' indicating a differentiated service level a packet must have to match rule 210 and follow the specified action. The action field has a value of 'allow routing,' indicating that a packet must allow routing to match rule 210 and be routed from the specified source and source port to the specified destination through the specified port using the specified process and differentiated services level. It is noted that in alternative embodiments, rules may specify that certain fields must have an exact value or a value in a range, with or without the use of wild card values.

Figure 3:
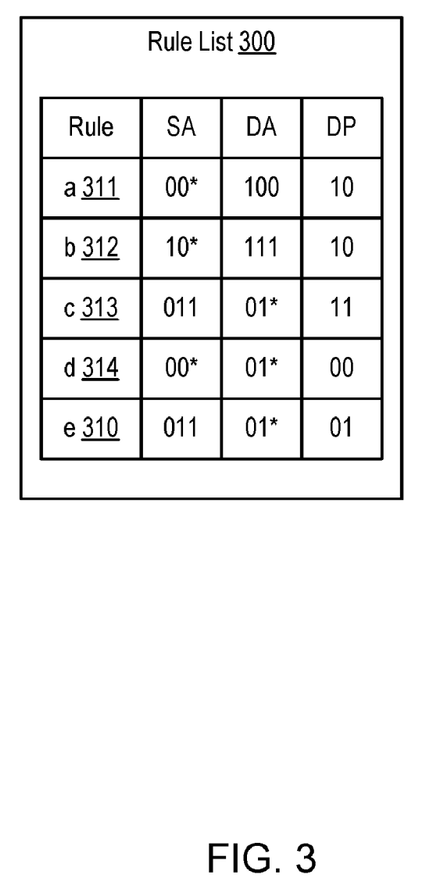
FIG. 3 illustrates one embodiment of a rule list that may be used to control packet access.

FIG. 3 illustrates one embodiment of a rule list 300 that may be used to control packet access. In one embodiment, rule list 300 may be part of a rule management system for processing data packets. Rule list 300 includes rules a, b, c, d, and e, also designated rules 311-315, respectively. In the illustrated embodiment, rules 311-315 have been restricted in size and number of included fields for purposes of illustration only. Each of rules 311-315 includes 8 bits divided into three fields, a 3-bit SA field, a 3-bit DA field, and a 2-bit Destination port field. Wild card values are included in the SA and DA fields, but the DP field is restricted to exact port values. It will be apparent to one of ordinary skill that rules with fewer or more fields of various lengths may be included in other embodiments.

Figure 4:
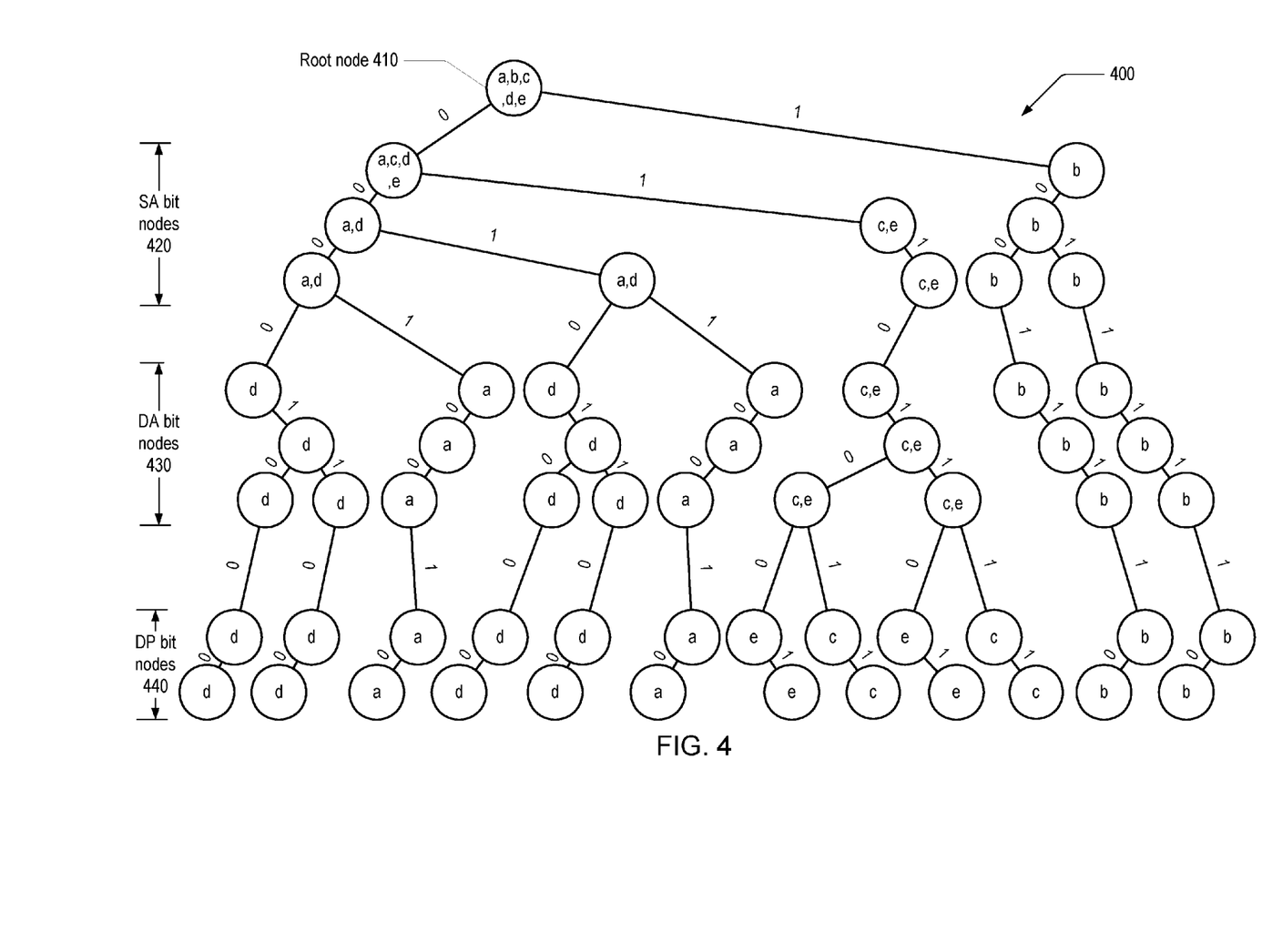
FIG. 4 illustrates one embodiment of a search trie that may be traversed to match the rules of FIG. 3.

FIG. 4 illustrates one embodiment of a search trie 400 that may be traversed to match the rules of FIG. 3, thereby identifying a least cost rule. Trie 400 includes root node 410, nodes 420 representing rules that apply to SA bits, nodes 430 representing rules that apply to DA bits, and nodes 440 representing rules that apply to DP bits. Within trie 400 each node may have up to two sub-nodes. A sub-node branching to the left represents a bit equal to '0' and a sub-node branching to the right represents a bit equal to '1' To match a particular input bit string to one of rules a through e, trie 400 may be traversed starting at root node 410. All of filters a through e are potential matches at root node 410. If the leftmost bit is a '0,' a search may progress to the left of root node 410, where a sub-node that matches filters a, c, d, and e may be found. If the leftmost bit is a '1,' a search may progress to the right of root node 410, where a sub-node that matches filter b may be found. Subsequent bits may be used to determine which direction to progress in searching trie 400 until the bottom row is reached. Each node in the bottom row specifies one filter as the best match to the input bit string. Trie 400 includes only branches that match the filters illustrated in FIG. 3. Consequently, during traversal of trie 400, for a given input bit string, if a node is reached at which no matching sub-node exists, then no matching filter exists for the input bit string. It is noted that the use of search trie 400 is but one example of a variety of algorithms that may be used to match the rules of FIG. 3 or any other set of rules. Any algorithm that produces that same matching input string may be used. Also, in the examples that follow, search tries will be used to match IP address portions of complex rules although any other suitable algorithm or combination of algorithms may be used in place of the individual search tries.

Figure 5:
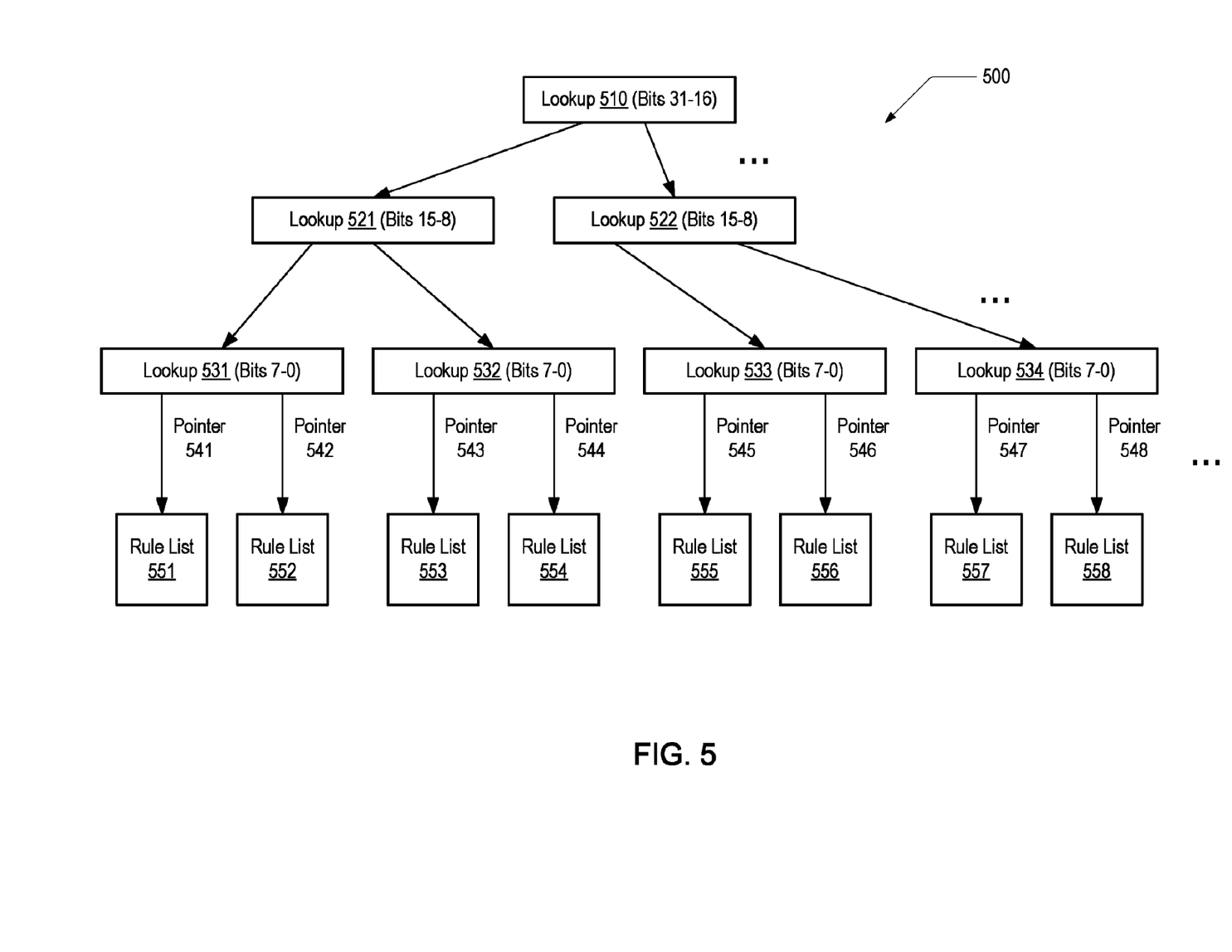
FIG. 5 illustrates one embodiment of a portion of a search trie constructed from rules that apply to a single IPv4 address.

If the size restrictions that were applied to rules 311-315 are expanded to include rules that apply to IPv4 addresses, larger numbers of ports, etc, the resulting search tries may be much larger with many more branches than trie 400. One way to reduce the size of a search trie is to search on individual fields separately and combine the results. Methods for combining search results will be described below. FIG. 5 illustrates one embodiment of a portion of a search trie 500 constructed from rules that apply to a single IPv4 address. Trie 500 includes lookups 510, 521, 522, 531, 532, 533, and 534 arranged in three lookup rows where each row corresponds to a specific portion of the address. Trie 500 may be traversed using any of a variety of algorithms similar to the algorithm used to search trie 400 in order to identify a set of rules. In one embodiment, lookups may be divided into a 16-8-8 bit sequence. More specifically, a first level lookup, lookup 510, may be used to search for a match to the first 16 bits (bits 31-16) of an IPv4 address. The results of the first search may be used to select one of number of second level lookups represented in FIG. 5 by lookups 521 and 522 that may be used to search for a match to the next 8 bits (bits 15-8). The results of the second search may be used to select one of number of third level lookups represented in FIG. 5 by lookups 531, 532, 533, and 534 that may be used to search for a match to the next 8 bits (bits 7-0). The exact number of lookups in each level may vary according to the number of rules and the details of the rules used to construct trie 500. More rules, more rules that include wildcards, and more differences between rules will expand the number of lookups in trie 500.

In the embodiment illustrated in FIG. 5, each of the bottom nodes in trie 500 stores a pointer to a list of rules. For example, lookup 531 has pointers 541 and 542 that point to rule lists 551 and 552, respectively. Similarly, pointers 543-548 point to rule lists 553-558, respectively. In alternative embodiments, additional level three lookups, pointers, and rule lists may be included in trie 500. Each of rule lists 551-558 may include rules having prefixes that match the corresponding IP address. Rules that match prefixes of two different lengths may be included in a rule list. For example, using Classless Inter-Domain Routing (CIDR) notation to specify addresses, if an address matches both a /16 and a /24 prefix, rules corresponding to both prefixes may be included in the rule list. In addition, each of rule lists 551-558 may include multiple rules corresponding to various values for each of the other fields not used to construct trie 500, such as a second IP address, source and destination ports, protocol ID, and/or DSCP. In an alternative embodiment, instead of storing a pointer to a rule list at each node of the third level of trie 500, the rule lists may be stored at the third level nodes.

Figure 6:
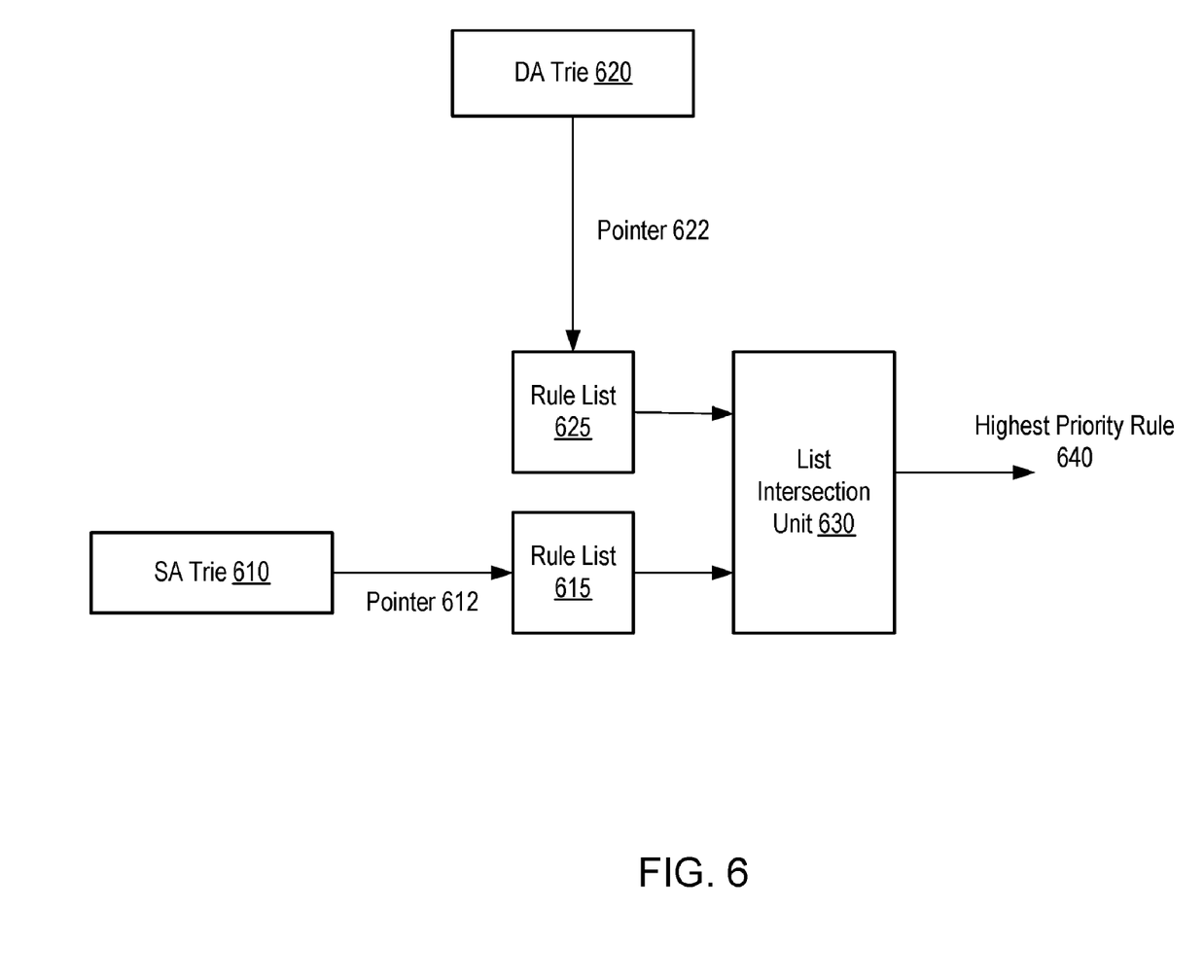
FIG. 6 illustrates one embodiment of a rule management system for combining the output of two independent searches to find a highest priority rule.

FIG. 6 illustrates one embodiment of a rule management system for combining the output of two independent searches to find a highest priority rule 640. In the illustrated embodiment, a list intersection unit 630 combines output rule lists 615 and 625 from SA trie 610 and DA trie 620, respectively, to find highest priority rule 640. Each of SA trie 610 and DA trie 620 may be a data structure similar to trie 500 as illustrated in FIG. 5. In one embodiment, traversal of SA trie 610 may yield a pointer 612 to rule list 615. Rule list 615 may be an ordered list of rules that match a particular input SA. Similarly, traversal of DA trie 620 may yield a pointer 622 to rule list 625. Rule list 625 may be an ordered list of rules that match a particular input SA. In a further embodiment, each of rule lists 615 and 625 may be ordered according to rule priority. List intersection unit 630 may combine rule lists 615 and 625 by finding their intersection, that is, generating an ordered list of all of the rules that are found in both rule list 615 and rule list 625. The result is an ordered list of rules that are satisfied by both the SA and the DA. Since the list is ordered, the first rule that is satisfied by the remaining fields of the input data may be selected as the highest priority rule 640.

Figure 7:
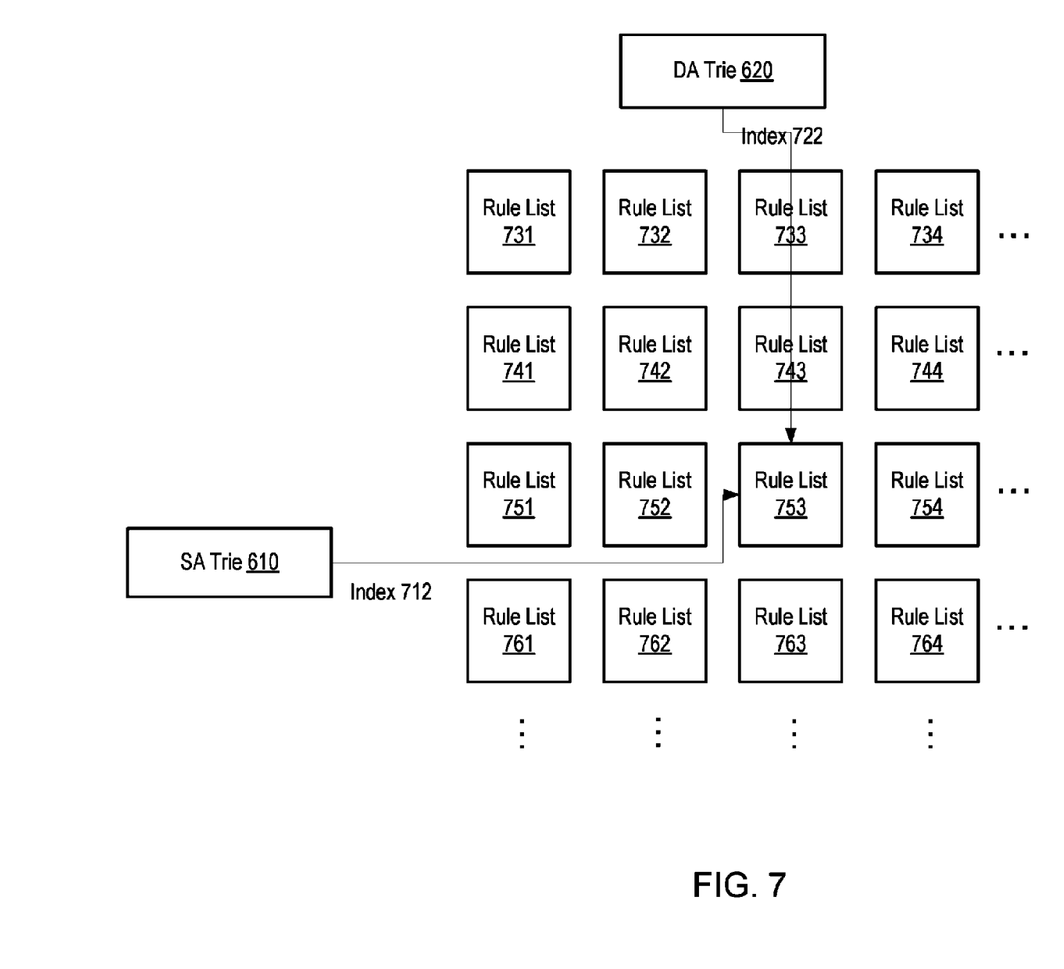
FIG. 7 illustrates an alternative embodiment of a rule management system for combining the output of two independent searches to find a highest priority rule.

FIG. 7 illustrates an alternative embodiment of a rule management system for combining the output of two independent searches to find a highest priority rule. In this alternative embodiment, instead of storing a rule list at each output node, SA trie 610 and DA trie 620 may store an index at each node. For example, in the example illustrated in FIG. 7, SA trie 610 and DA trie 620 may output indexes 712 and 722, respectively. Indexes 712 and 722 may be used to identify one of a pre-computed set of common rule lists. Rule lists 731-734, 741-744, 751-754, and 761-764 as shown represent a portion of the pre-computed set of common rule lists arranged in a two-dimensional matrix in which index 712 identifies a vertical position and index 722 identifies a horizontal position. For example, in the illustrated embodiment, rule list 753 is identified. In alternative embodiments, there may be more or fewer than the illustrated number of pre-computed common rule lists. As with the output of list intersection unit 630 of FIG. 6, rule list 753 may comprise an ordered list of rules that are satisfied by both the SA and the DA. If the list is ordered, the first rule that is satisfied by the remaining fields of the input data may be selected as the highest priority rule.

Figure 8:
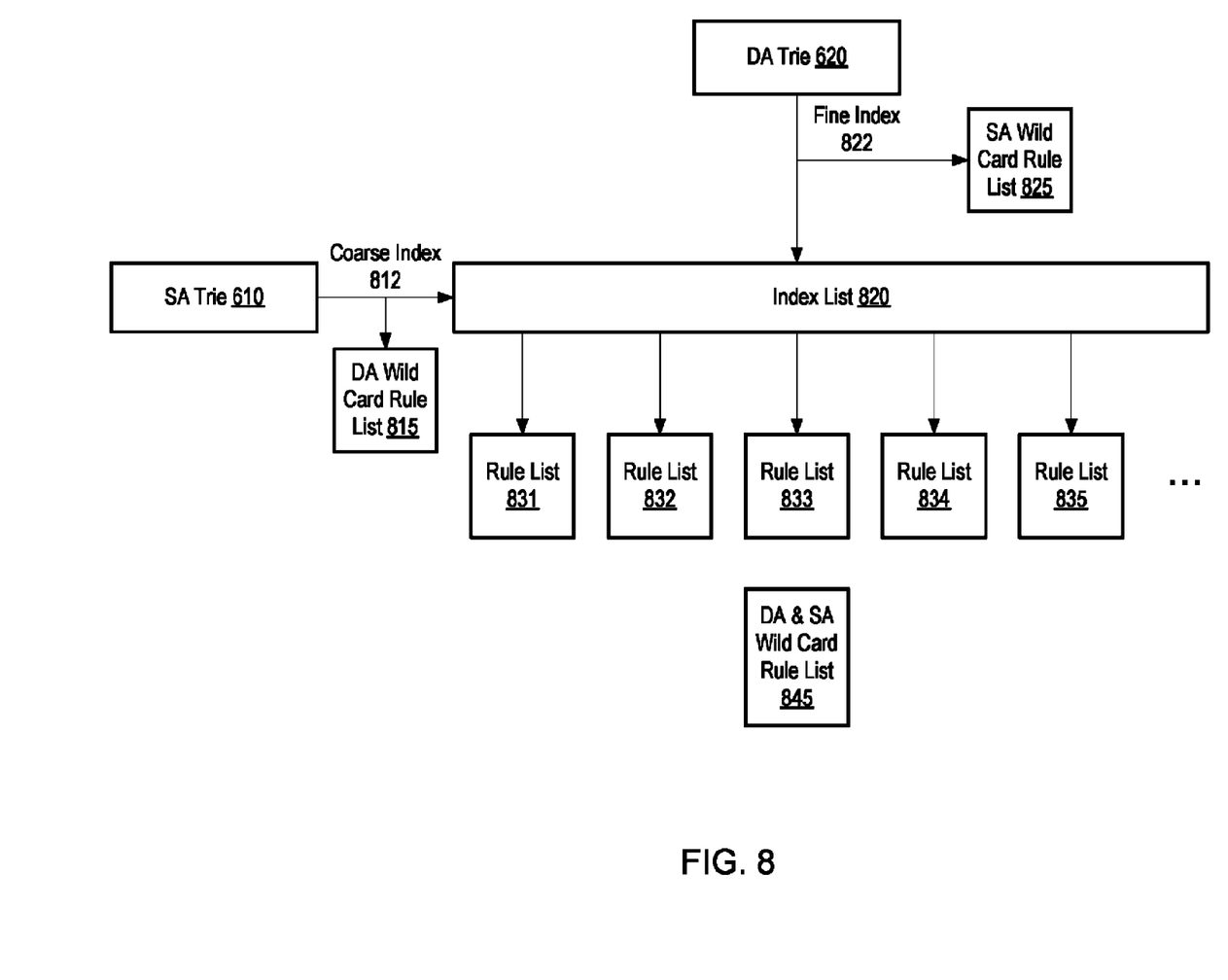
FIG. 8 illustrates another alternative embodiment of a rule management system for combining the output of two independent searches to find a highest priority rule.

FIG. 8 illustrates another alternative embodiment of a rule management system for combining the output of two independent searches to find a highest priority rule. In this alternative embodiment, in addition to storing an index at each node, SA trie 610 may store a rule list at each node that includes only rules that match the SA rules that correspond to the node and for which the DA is a wild card and DA trie 620 may store a rule list at each node that includes only rules that match the DA rules that correspond to the node and for which the SA is a wild card. For example, in the example illustrated in FIG. 8, SA trie 610 may output coarse index 812 and DA wild card rule list 815. DA trie 620 may output fine index 822 and SA wild card rule list 825. Indexes 812 and 822 may point to an element of index list 820. Index list 820 may be a linked list of indexes, each of which identifies one of a set of rule lists 831-835, etc. The data structure used to store rule lists 831-835, etc. may not include storage for null lists, unlike the data structure used to store the pre-computed set of common rule lists illustrated in FIG. 7. Also, rule lists 831-835 may store only rules for which neither the SA nor the DA includes a wildcard. In addition to rule lists 815, 825, and 831-835, etc., a rule list 845 may stores rules for which both the SA and the DA are wildcards.

During operation, tries 610 and 620 may be traversed to identify a pair of indexes and a pair of wild card rule lists, such as coarse index 812, fine index 822, DA wild card rule list 815, and SA wild card rule list 825. Coarse index 812 may be used to identify a region of indexes within index list 820. Fine index 822 may then be used to identify a particular index within the identified region. The identified index may point to a particular rule list among rule lists 831-835, etc. The identified rule list may be merged with DA wild card rule list 815, SA wild card rule list 825, and rule list 845 to produce an ordered list of rules that are satisfied by both the SA and the DA. If the list is ordered, the first rule that is satisfied by the remaining fields of the input data may be selected as the highest priority rule.

Figure 9:
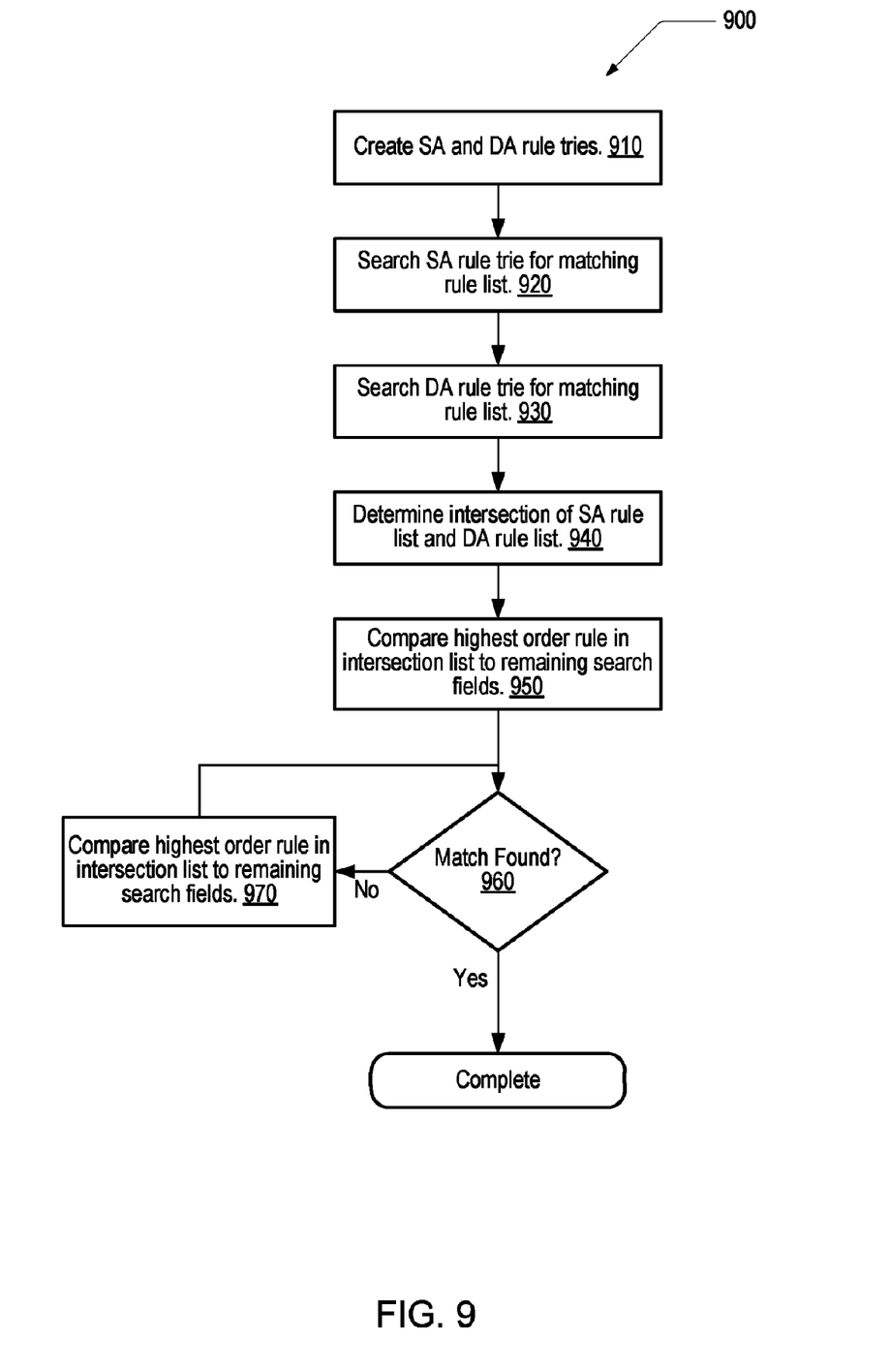
FIG. 9 illustrates one embodiment of a process that may be used by a rule management system to find a rule that matches multiple data fields.

FIG. 9 illustrates one embodiment of a process 900 that may be used by a rule management system to find a rule that matches multiple data fields. By way of example only, it is assumed that each of a set of rules from which a best match is sought includes at least two fields corresponding to a source address (SA) and a destination address (DA). It is further assumed that the SA and DA fields are searched separately from the remaining fields to obtain a match. In alternative embodiments, rules and separate searches may apply to a variety of other fields. Process 900 may begin with the creation of a separate trie-like structure for each of the SA and DA rules (block 910) wherein each leaf node stores a matching rule list. Next the SA rule trie may be searched for a first matching rule list (block 920). The DA rule trie may also be searched yielding a second matching rule list (block 930). The intersection of the first and second rule lists may be determined (block 940). Once the intersection of the first and second rule lists is determined, each rule in the intersection list may be compared to the remaining data fields (block 950). If the rule does not match the remaining fields (decision block 960), a next rule may be selected (block 970) and compared to the remaining fields. Blocks 960 and 970 may be repeated until a match is found, completing process 900. In one embodiment the first and second rule lists and the resulting intersection list may be ordered by priority. Then, the highest priority, matching rule may be found by searching the intersection list in order and selecting the first match that is encountered.

Figure 10:
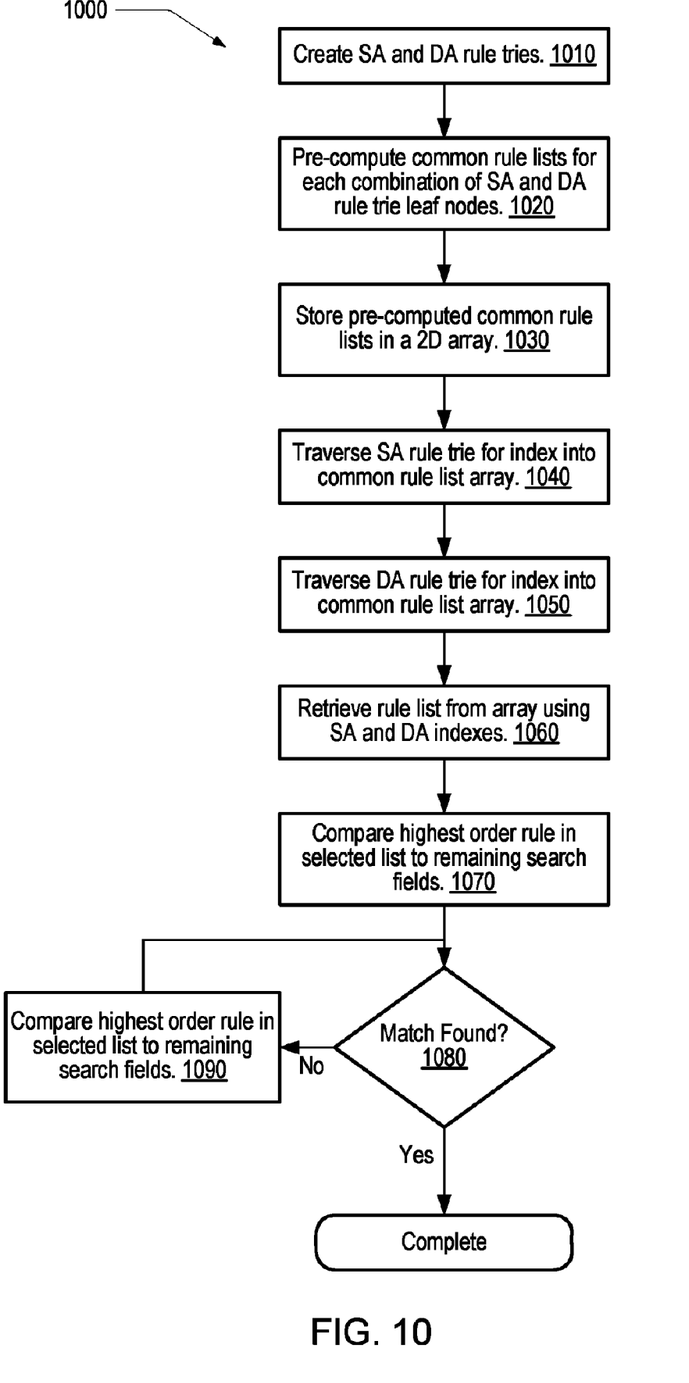
FIG. 10 illustrates an alternative embodiment of a process that may be used by a rule management system to find a rule that matches multiple data fields.

FIG. 10 illustrates an alternative embodiment of a process 1000 that may be used by a rule management system to find a rule that matches multiple data fields. By way of example only, it is assumed that each of a set of rules from which a best match is sought includes at least two fields corresponding to a source address (SA) and a destination address (DA). It is further assumed that the SA and DA fields are searched separately from the remaining fields to obtain a match. In alternative embodiments, rules and separate searches may apply to a variety of other fields. Process 1000 may begin with the creation of a separate trie-like structure for each of the SA and DA rules (block 1010) wherein each leaf node stores an index to an array of rule lists. For each possible combination of SA and DA rule trie leaf nodes, a common rule list may be pre-computed (block 1020) and stored in a two-dimensional array (block 1030). Next the SA rule trie may be searched for a first matching rule leaf node and an associated index (block 1040). The DA rule trie may also be searched yielding a second matching rule leaf node and an associated index (block 1050). The first and second rule list indexes may be used to retrieve a common rule list (block 1060). Once the common rule list is retrieved, each rule in the common list may be compared to the remaining data fields (block 1070). If the rule does not match the remaining fields (decision block 1080), a next rule may be selected (block 1090) and compared to the remaining fields. Blocks 1080 and 1090 may be repeated until a match is found, completing process 1000. In one embodiment the common rule lists may be ordered by priority. Then, the highest priority, matching rule may be found by searching the common list in order and selecting the first match that is encountered.

Figure 11:
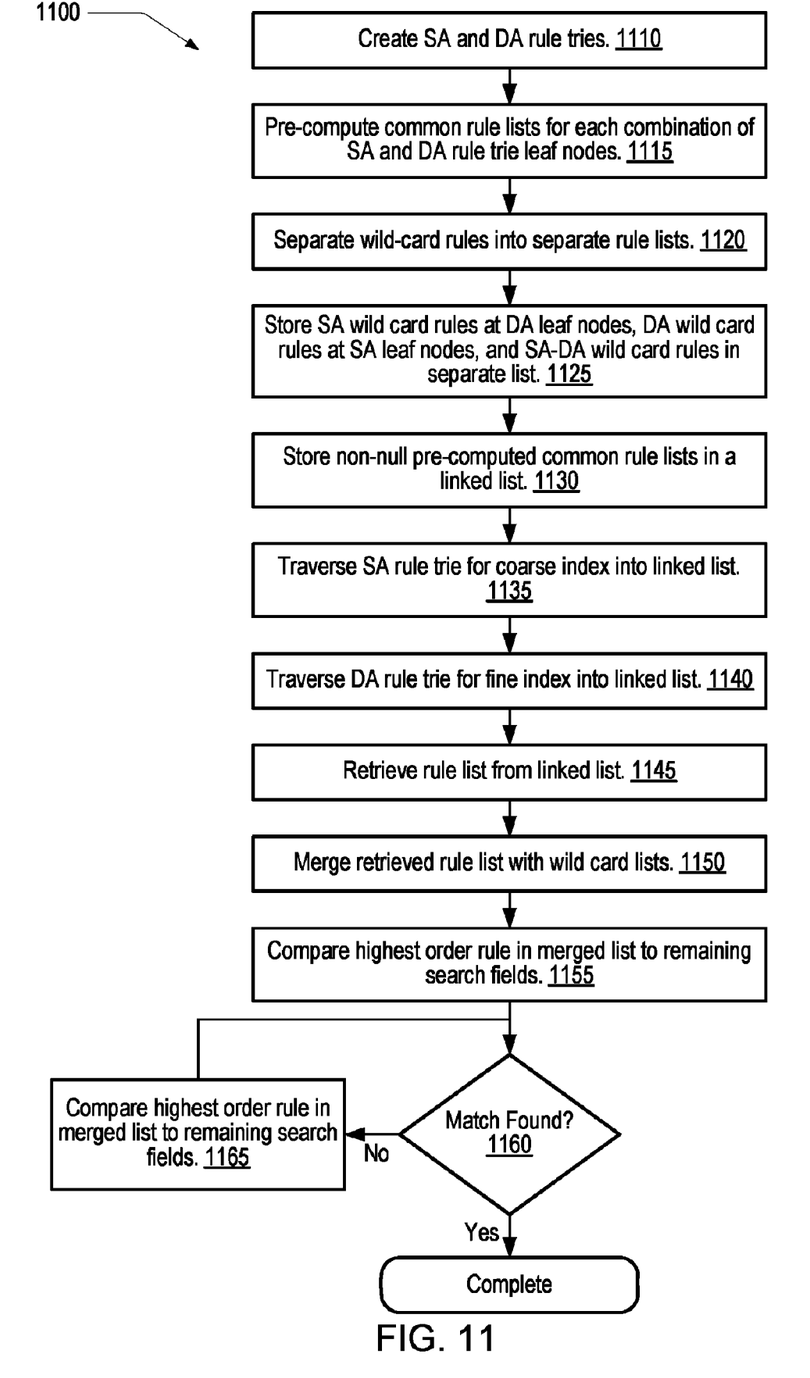
FIG. 11 illustrates another alternative embodiment of a process that may be used by a rule management system to find a rule that matches multiple data fields.

FIG. 11 illustrates another alternative embodiment of a process 1100 that may be used by a rule management system to find a rule that matches multiple data fields. By way of example only, it is assumed that each of a set of rules from which a best match is sought includes at least two fields corresponding to a source address (SA) and a destination address (DA). It is further assumed that the SA and DA fields are searched separately from the remaining fields to obtain a match. In alternative embodiments, rules and separate searches may apply to a variety of other fields. Process 1100 may begin with the creation of a separate trie-like structure for each of the SA and DA rules (block 1110). Each leaf node of the SA trie may store a coarse index into an index list. For each possible combination of SA and DA rule trie leaf nodes, a common rule list may be pre-computed (block 1115). Rules that include wild card in either the DA or the SA may be removed and placed in separate lists (block 1120). A first list may include rules with SA wildcards, a second list may include rules with DA wildcards, and a third list may include rules with both SA and DA wildcards (block 1125). The remaining, non-null rule lists may be stored in an indexed linked list (block 1130). Next the SA rule trie may be traversed for a first matching rule leaf node and an associated coarse index (block 1135). The DA rule trie may also be leaf node and a corresponding coarse index. The DA rule trie may also be traversed, yielding a second matching rule leaf node and an associated fine index (block 1140). The coarse and fine indexes may be used to identify a pointer to a particular rule list, which may be retrieved from the linked list a common rule list (block 1145). The retrieved rule list may be merged with the DA wildcards associated with the first matching node, the SA wildcards associated with the second matching node, and the SA-DA wildcards (block 1150). Once the rule lists are merged, each rule in the merged list may be compared to the remaining data fields (block 1155). If the rule does not match the remaining fields (decision block 1160), a next rule may be selected (block 1165) and compared to the remaining fields. Blocks 1160 and 1165 may be repeated until a match is found, completing process 1100. In one embodiment the wild card rule lists and pre-computed rule lists may be ordered by priority and the priority preserved during list merges. Then, the highest priority, matching rule may be found by searching the merged list in order and selecting the first match that is encountered.

It is noted that in alternative embodiments, the individual blocks illustrated in processes 900, 1000, and 1100 that are described in detail above may be executed in a different order and/or that some blocks may be executed in parallel with others.

It is further noted that the above-described embodiments may comprise software. For example, the functionality of computer system 110 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for creating a rule management system for processing data packets, the method comprising:

associating each of a plurality of nodes of a data structure with a respective one of a plurality of possible combinations of first and second data field values;

including in the data structure a node corresponding to each combination of first and second data field values for which there exists at least one rule of a plurality of rules; and excluding from the data structure at least one node corresponding to at least one combination of first and second data field values for which there does not exist a rule of a plurality of rules; and associating one or more rules of the plurality of rules with each node of the data structure;

wherein a node and an associated set of one or more rules for processing a received data packet may be identified by determining first and second indices into the data structure that correspond to first and second data field values of the received data packet storing in a first wild card list, a first subset of the plurality of rules that match a plurality of first and second data field values;

storing in a second wild card list, a second subset of the plurality of rules that match a plurality of first data field values and particular second data field values; and storing in a third wild card list, a third subset of the plurality of rules that match a plurality of second data field values and particular first data field values.

2. The method as recited in claim 1, wherein a first rule for processing the received data packet is selected from a fourth subset of rules comprising rules associated with a node identified by the first and second indices, rules stored in the first wild card rule list, rules stored in the second wild card rule list, and rules stored in the third wild card rule list.

3. The method as recited in claim 2, wherein the first rule of the fourth subset of rules is a highest priority rule.

4. The method as recited in claim 1:
wherein determining a first index of the first and second indices comprises traversing a first hierarchical data structure from a root node to a first leaf node that corresponds to a received first data field value and selecting an index that corresponds to the first leaf node; and wherein determining a second index of the first and second indices comprises traversing a second hierarchical data structure from a root node to a second leaf node that corresponds to a received second data field value and selecting an index that corresponds to the second leaf node.

5. The method as recited in claim 1, wherein each rule of the plurality of rules specifies whether or not a particular value of the first and second data field values is included in an access control list.

6. The method as recited in claim 5, wherein processing a data packet comprises routing the data packet according to the access control list.

7. A rule management system for processing data packets the system comprising:
an interface for receiving data packets comprising a plurality of data fields; and a processor, wherein the processor is configured to:
include in a data structure nodes corresponding to combinations of first and second data field values, wherein said data structure:
includes a node corresponding to each combination of first and second data field values for which there exists at least one rule of a plurality of pre-computed rules; and excludes at least one node corresponding to at least one combination of first and second data field values for which there does not exist a rule of the plurality of pre-computed rules; and associate one or more rules of the plurality of rules with each node of the data structure;

process a received data packet using a set of one or more rules associated with a node identified by determining first and second indices into the data structure that correspond to first and second data field values of the received data packet;

store in a first wild card list, a first subset of the plurality of pre-computed rules that match a plurality of first and second data field values;

store in a second wild card list, a second subset of the plurality of pre-computed rules that match a plurality of first data field values and particular second data field values; and store in a third wild card list, a third subset of the plurality of pre-computed rules that match a plurality of second data field values and particular first data field values.

8. The system as recited in claim 7, wherein the processor is further configured to select a first rule for processing the received data packet from a fourth subset of rules comprising rules associated with a node identified by the first and second indices, rules stored in the first wild card rule list, rules stored in the second wild card rule list, and rules stored in the third wild card rule list.

9. The system as recited in claim 7, wherein the first rule of the fourth subset of rules is a highest priority rule.

10. The system as recited in claim 7:
wherein determining a first index of the indices comprises traversing a first hierarchical data structure from a root node to a first leaf node that corresponds to a received first data field value and selecting an index that corresponds to the first leaf node; and wherein determining a second index of the indices comprises traversing a second hierarchical data structure from a root node to a second leaf node that corresponds to a received second data field value and selecting an index that corresponds to the second leaf node.

11. The system as recited in claim 7, wherein each rule of the plurality of pre-computed rules specifies whether or not a particular value of the data fields is included in an access control list.

12. The system as recited in claim 11, wherein processing a data packet comprises routing the data packet according to the access control list.

13. A computer-readable storage medium storing instructions that, when executed, cause a processor to:
include in a data structure nodes corresponding to combinations of first and second data field values, wherein said data structure:
includes a node corresponding to each combination of first and second data field values for which there exists at least one rule of a plurality of rules; and does not include at least one node corresponding to at least one combination of first and second data field values for which there does not exist a rule of a plurality of rules; and associate one or more rules of the plurality of rules with each node of the data structure;

wherein a node and an associated set of one or more rules for processing a received data packet may be identified by determining first and second indices into the data structure that correspond to first and second data field values of the received data packet store in a first wild card list, a first subset of the plurality of rules that match a plurality of first and second data field values;

store in a second wild card list, a second subset of the plurality of rules that match a plurality of first data field values and particular second data field values; and store in a third wild card list, a third subset of the plurality of rules that match a plurality of second data field values and particular first data field values.

14. The computer-readable medium as recited in claim 13, wherein the instructions are further executable to cause the processor to select a first rule for processing the received data packet from a fourth subset of rules comprising rules associated with a node identified by the first and second indices, rules stored in the first wild card rule list, rules stored in the second wild card rule list, and rules stored in the third wild card rule list.

15. The computer-readable medium as recited in claim 13, wherein the first rule of the fourth subset of rules is a highest priority rule.

16. The computer-readable medium as recited in claim 13:

wherein determining a first index of the indices comprises traversing a first hierarchical data structure from a root node to a first leaf node that corresponds to a received first data field value and selecting an index that corresponds to the first leaf node; and wherein determining a second index of the indices comprises traversing a second hierarchical data structure from a root node to a second leaf node that corresponds to a received second data field value and selecting an index that corresponds to the second leaf node.

17. The computer-readable medium as recited in claim 13, wherein each rule of the plurality of rules specifies whether or not a particular value of the data fields is included in an access control list and wherein processing a data packet comprises routing the data packet according to the access control list.

18. A method for creating a rule management system for processing data packets, the method comprising:

associating each of a plurality of nodes of a data structure with a respective one of a plurality of possible combinations of first and second data field values;

including in the data structure a node corresponding to each combination of first and second data field values for which there exists at least one rule of a plurality of rules; and excluding from the data structure at least one node corresponding to at least one combination of first and second data field values for which there does not exist a rule of a plurality of rules; and associating one or more rules of the plurality of rules with each node of the data structure;

wherein a node and an associated set of one or more rules for processing a received data packet may be identified by determining first and second indices into the data structure that correspond to first and second data field values of the received data packet;

wherein determining a first index of the first and second indices comprises traversing a first hierarchical data structure from a root node to a first leaf node that corresponds to a received first data field value and selecting an index that corresponds to the first leaf node; and wherein determining a second index of the first and second indices comprises traversing a second hierarchical data structure from a root node to a second leaf node that corresponds to a received second data field value and selecting an index that corresponds to the second leaf node.

19. A rule management system for processing data packets the system comprising:

an interface for receiving data packets comprising a plurality of data fields; and a processor, wherein the processor is configured to:

include in a data structure nodes corresponding to combinations of first and second data field values, wherein said data structure:

includes a node corresponding to each combination of first and second data field values for which there exists at least one rule of a plurality of pre-computed rules; and excludes at least one node corresponding to at least one combination of first and second data field values for which there does not exist a rule of the plurality of pre-computed rules; and associate one or more rules of the plurality of rules with each node of the data structure;

process a received data packet using a set of one or more rules associated with a node identified by determining first and second indices into the data structure that correspond to first and second data field values of the received data packet;

wherein determining a first index of the indices comprises traversing a first hierarchical data structure from a root node to a first leaf node that corresponds to a received first data field value and selecting an index that corresponds to the first leaf node; and wherein determining a second index of the indices comprises traversing a second hierarchical data structure from a root node to a second leaf node that corresponds to a received second data field value and selecting an index that corresponds to the second leaf node.

20. A computer-readable storage medium storing instructions that, when executed, cause a processor to:

include in a data structure nodes corresponding to combinations of first and second data field values, wherein said data structure:

includes a node corresponding to each combination of first and second data field values for which there exists at least one rule of a plurality of rules; and does not include at least one node corresponding to at least one combination of first and second data field values for which there does not exist a rule of a plurality of rules; and associate one or more rules of the plurality of rules with each node of the data structure;

wherein a node and an associated set of one or more rules for processing a received data packet may be identified by determining first and second indices into the data structure that correspond to first and second data field values of the received data packet;

wherein determining a first index of the indices comprises traversing a first hierarchical data structure from a root node to a first leaf node that corresponds to a received first data field value and selecting an index that corresponds to the first leaf node; and wherein determining a second index of the indices comprises traversing a second hierarchical data structure from a root node to a second leaf node that corresponds to a received second data field value and selecting an index that corresponds to the second leaf node.

* * * * *